June 29, 1965 YUTAKA SAITO 3,191,642
AUTOMATIC FEEDER OF PULVERULENT BODY
Filed Sept. 19, 1963 3 Sheets-Sheet 1

INVENTOR.
YUTAKA SAITO
BY
Stevens, Davis, Miller & Mosher
ATTORNEYS

June 29, 1965  YUTAKA SAITO  3,191,642
AUTOMATIC FEEDER OF PULVERULENT BODY
Filed Sept. 19, 1963  3 Sheets-Sheet 2

INVENTOR.
Yutaka Saito
BY
Stevens, Davis, Miller & Mosher
ATTORNEYS

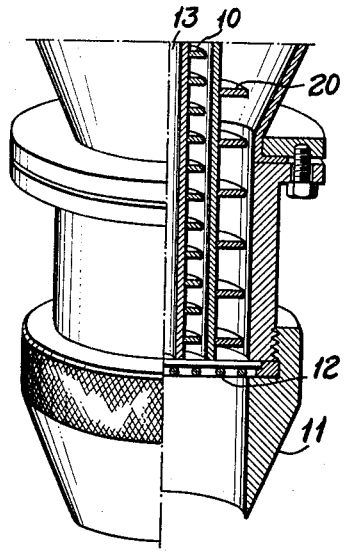
FIG_4_
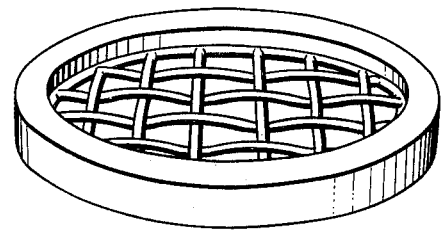
FIG_5_
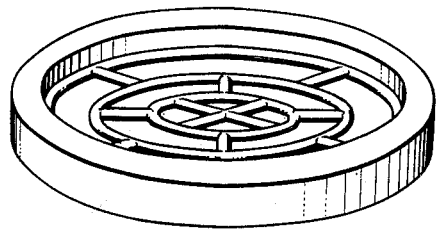
FIG_6_

United States Patent Office 3,191,642
Patented June 29, 1965

3,191,642
AUTOMATIC FEEDER OF PULVERULENT BODY
Yutaka Saito, Tokyo, Japan, assignor to Nissan Kagaku Kogyo Kabushiki Kaisha, Tokyo, Japan, a corporation of Japan
Filed Sept. 19, 1963, Ser. No. 310,091
Claims priority, application Japan, Sept. 24, 1962, 37/41,779
4 Claims. (Cl. 141—128)

This invention relates to an automatic quantitative feeder which is operated cleanly and accurately by concentrically positioned inner and outer shaft screws.

Among the conventional automatic quantitative feeders, the vibrator system is liable to raise powder dust due to the large percentage of powder voids and requires a container of large dimension, which causes the natural falling of powder when the feed is suspended. The screw feeder system causes spontaneous falls of the pulverulent body after the suspension of screws. Accordingly it is very difficult to make accurate automatic feed of pulverulent body for either system.

The present invention solves those problems of the abovementioned devices. The present invention operates to adjust the percentage of voids of pulverulent body by revolving a pressure plate; press the pulverulent body and eliminate voids so as to avoid any possibility of raising dust; provide fluidity to the majority of pulverulent body fed into the lower part of the storage tank by rotating the outer shaft mixing blades. While the large quantity of material is fed into a container passing through a screen by pressure from the outer shaft screws, a part of the pulverulent body fed into the lower part of the tank is discharged into the inner shaft tank by guide blades mounted on the inner shaft tank and fluidity is given thereto by rotation of the inner shaft mixing blade. The same part of the pulverulent body is further fed in a very small quantity into the container through a screen for an appropriate time by rotating the inner shaft screw when the large amount of feed is stopped by the outer shaft screw.

In this case, the screen is acting as the resistor to the pulverulent body, and effects the function of momentary suspension of the falls of pulverulent body. Also on-off operations of the inner and outer shaft screws are independently controlled by the friction clutches linked with magnetic coils.

To further illustrate the present invention, reference is made to the drawings, FIGURES 1 to 6.

FIG. 4 illustrates a partial cutaway exploded perspective of the feeder outlet of pulverulent body; and FIGS. 5 and 6 illustrate various screens.

Figure 1:
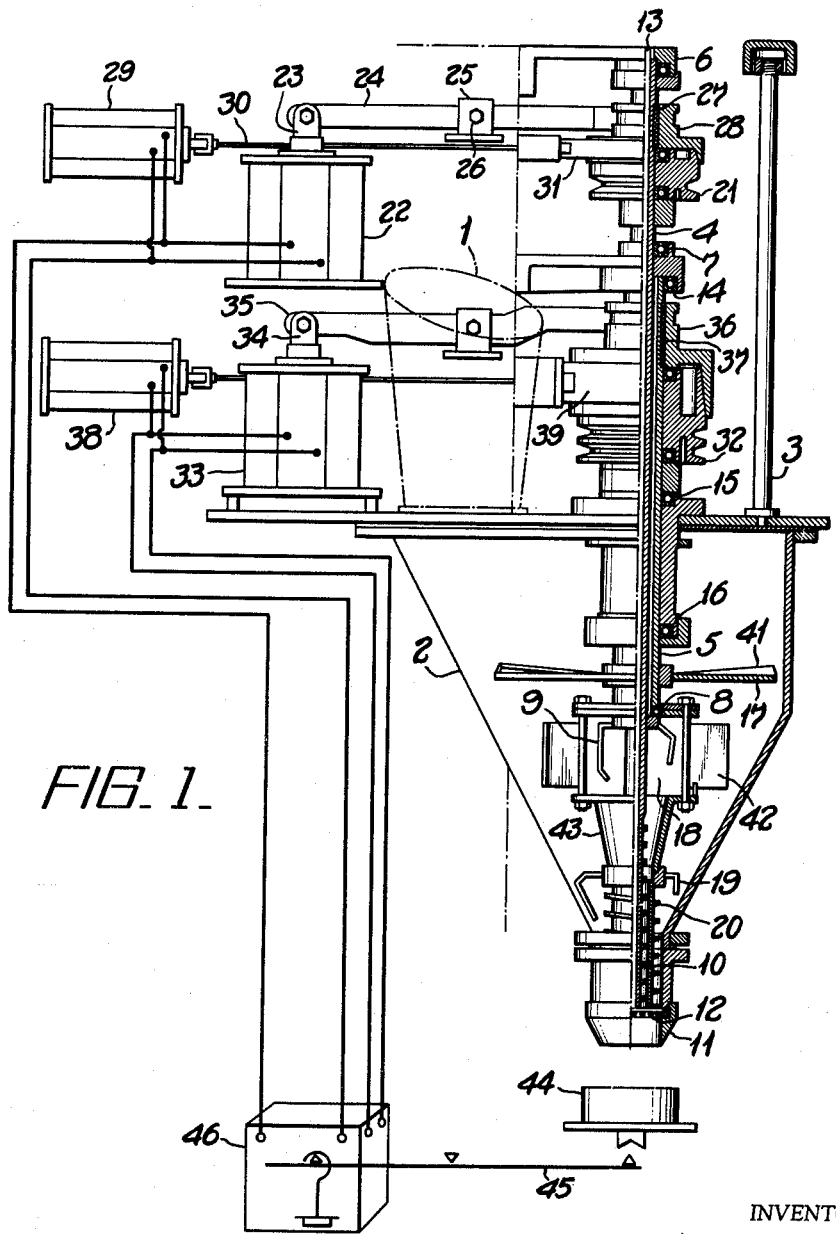
FIG. 1 illustrates a partial cross section of the apparatus and a schematic representation of electromagnetic circuits.
Figure 2:
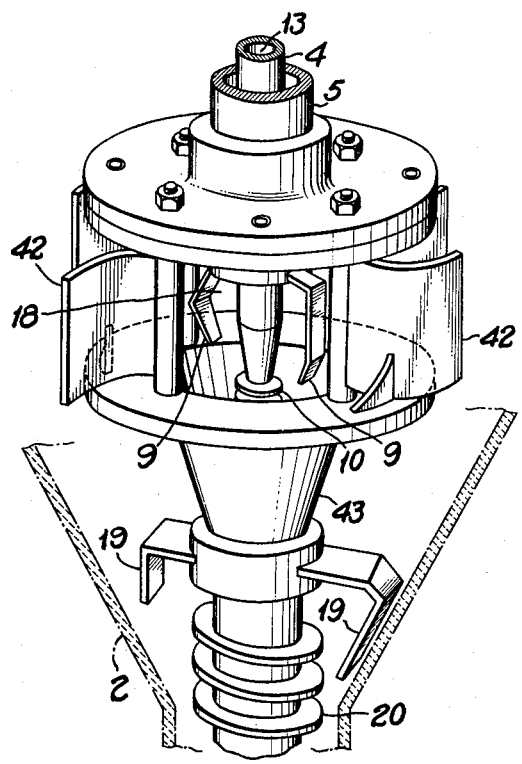
FIG. 2 illustrates an exploded perspective of the inner shaft storage tank of this equipment.
Figure 3:
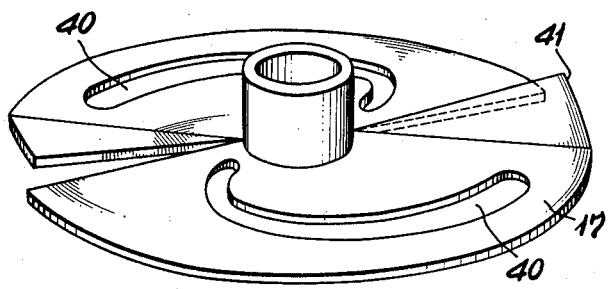
FIG. 3 illustrates an exploded perspective of the pressure plate.

The detailed explanation of this invented equipment are as follows:

1 indicates the charging inlet for the pulverulent body,
2 indicates the storage tank,
3 indicates the vent pipe,
4 indicates the inner shaft which is supported by top bearing 6 and intermediate shaft bearing 7 and lower bearing 8,
18 indicates a storage tank for the inner shaft,
9 indicates a shaft mixing blade,
10 indicates an inner shaft screw, and
5 indicates an outer shaft which contains a concentric inner shaft.

The outer shaft is supported by top bearing 14 positioned on the outer shaft, intermediate shaft bearing 15 and lower bearing 16.

Numeral 19 indicates the outer shaft mixing blade,
21 indicates the cone pulley for the inner shaft which is freely fitted on the inner shaft 4 and revolves constantly.

The iron core of magnetic coil 22 for the clutch is linked with clutch lever 24 which is held by a pin 26 of fulcrum support 25 and connected with cone faced friction clutch 28.

A friction clutch 28 for the inner shaft is fitted on inner shaft 4 by key 27. The clutch 28 periphery is enclosed by brake block 31 which brake forces on inner shaft friction clutch 28 at a proper time by transmitting motion from the iron core of magnetic coil 29 to brake link 30.

In a similar manner, 32 is fitted freely on outer shaft 5 and revolves constantly. A cone pulley for outer shaft 36 makes conical surface contact with the friction clutch for the outer shaft and fits on the outer shaft 5 by key 37.

Numeral 33 indicates a magnetic coil for the clutch,
34 indicates an iron core,
35 indicates a clutch control lever, and
38 indicates a magnetic coil for the brake.

Brake block 39 encloses the periphery of friction clutch 36 of the outer shaft.

Clutch control levers 24 and 35 move friction clutches 28 and 36 up and down by operating a magnetic coil for the clutch. Thus conical surfaces of both pulleys 21 and 32 and friction clutches 28 and 36 engage or disengage each other, and this causes revolving or stopping of shafts 4 and 5.

In this case, in order to avoid the unsteady stop motion of the shaft due to inertia action, controlling magnetic coils 29 and 38 are activated simultaneously with releasing of the conical surface contact to apply brake blocks 31 and 39 on the periphery of friction clutches 28 and 36 to insure the stopping of shaft rotation. Screen 12 is supported by screen support ring 11, and the shaft tube is provided with vent 13 to remove dust. In addition to this, the supplemental explanation of the method of operation of the pulverulent body automatic feeder is described as follows:

A pulverulent body after being charged from charging inlet and filled in tank 2 is firstly pressed down by revolving pressure blades 17 which have adequate pressing surfaces 41. However a part of pulverulent body that contains considerable air is carried back to the top section by egressing through either slot holes 40 of pressure blades 17 or the clearance provided between the interior wall of the tank and pressure blades 17. The regressed pulverulent body is pressed down to the lower section of tank 2 by eliminating any possibility of raising dust by de-airing from vent 3 and repeating the pressing step and air separation procedures by pressure blades 17.

When the majority of pulverulent body fed into the lower section of tank 2 is carried to the position of mixing blade 19 that is mounted on outer shaft 5, it is given undulated forces to increase the fluidity and fed into container 44 by outer shaft screw 20 after passing through screen 12. Simultaneously a part of pulverulent body is fed into inner shaft tank 18 by guide blade 42 mounted on inner shaft tank 18 and also given increased fluidity by operation of inner shaft mixing blade 9.

A small amount is fed into container 44 after it moves through tapered tube 43 by operation of inner shaft screw 10 and screen 12. When the proper amount is filled in container 44, magnetic coil 33 of the clutch is operated by activation of limit switch 46 mounted on scale 45. Then, outer shaft friction clutch 36 is released and simultaneously outer shaft 5 stops its rotation by action of brake block 39. Accordingly a small amount of feed continues by operation of the inner shaft screw only. When the container completes the filling, magnetic clutch coil 22 operates by the action of limit switch 46 mounted on scale 45, and inner shaft friction clutch 28 is released. Simultaneously brake block 31 is applied and this makes inner shaft 4 stop its rotation, and thus one feed is completed. Hereupon it is possible to effect the momentary suspension of the falls of pulverulent body following the stop of screws by rendering the screen 12 (exemplified in FIGS. 5 and 6) to act as the resistor of the pulverulent body.

Vent pipe 13 provided in inner shaft 4 absorbs the excess air that is replaced with pulverulent body charged into the container 44. This prevents raising dust.

After the large quantity feed from outer shaft 5 is stopped, the additional small quantity feed from inner shaft 4 is rated about 5–10% of total fed amount. Feed time required is extremely short. For example, it takes about 3 seconds to fill 500 gr. and 1 second to fill 155 gr. It is possible to feed nearly without raising unwanted dust. Two examples of this invented device are described by the following scale tests:

(1) Scale test of Sicarol:
    Apparent specific gravity _____ 0.38.
    Grain size _____ 200 mesh all pass.
    Scaling weight _____ 155 gr.
    Time required for one charge__ Approx. 1 sec.

The results are shown as follows:

| No.: | Measured values (gr.) |
|---|---|
| 1 | 155 |
| 2 | 156 |
| 3 | 156 |
| 4 | 156 |
| 5 | 156.5 |
| 6 | 156 |
| 7 | 156 |
| 8 | 156.5 |
| 9 | 156 |
| 10 | 156.5 |

(2) Scale test of powdered juice:
    Scaling weight _____gr__ 500
    Time required for one charge _____sec__ 3

The results are shown as follows:

| No.: | Measured values (gr.) |
|---|---|
| 1 | 500 |
| 2 | 500 |
| 3 | 500 |
| 4 | 501 |
| 5 | 501 |
| 6 | 500 |
| 7 | 500 |
| 8 | 500 |
| 9 | 501 |
| 10 | 501 |

I claim:

1. An apparatus for quantitively feeding a pulverulent material comprising, a receptacle, outer shaft screw means for feeding an amount of material to said receptacle, inner shaft screw means having a portion thereof located axially within said outer shaft screw means and being independently rotatable with respect to said outer shaft screw means for feeding an amount of material through said outer shaft screw means to said receptacle, and a screen means mounted across the discharge ends of said outer and inner shaft screw means for impeding the movement of material therethrough and preventing unwanted movement of pulverulent material therethrough after the stopping of rotations of said outer and inner shaft screw means.

2. An apparatus as set forth in claim 1 wherein said outer and inner shaft screw means comprise first and second rotation control means respectively, said first rotation control means adapted to stop rotation of said outer shaft screw means after a predetermined amount of pulverulent material is deposited in said receptacle and said second rotation control means adapted to stop rotation of said inner shaft screw means when a predetermined amount of pulverulent material has been fed therefrom after the stopping of said outer shaft screw means rotation.

3. An apparatus as set forth in claim 2 wherein the amount of pulverulent material fed by said inner shaft screw means after rotation of said outer shaft screw means stopped comprises substantially 5 to 10 percent of the total pulverulent material fed.

4. An apparatus as set forth in claim 1 further comprising a storage tank housing portions of said outer and inner shaft screw means and adapted to receive the material to be fed, a rotary pressing plate means rigidly mounted to said outer shaft screw means within said storage tank for pressurizing and controlling the void rate of the material to be fed and removing air therefrom to prevent the formation of dust, first stirring blades connected to said outer shaft screw means in said tank for enhancing the fluidity of the pressurized material fed by said outer shaft screw means, second stirring blades connected to the inner shaft screw means in said tank for enhancing the fluidity of the pressurized material fed by said inner shaft screw means, said outer shaft screw means having guide plate means mounted thereon contiguous said second stirring blades for delivering a portion of pressurized material in said tank to said second stirring blades and said inner shaft screw means, and said screen means being non-rotatably mounted at the lower end of said tank, whereby the pulverulent material is suspended upon the stopping of rotation of said outer and inner shaft screw means by said screen means.

References Cited by the Examiner

UNITED STATES PATENTS

| 400,807 | 4/89 | Toepfer | 222—241 X |
|---|---|---|---|
| 1,128,043 | 2/15 | Quigley. | |
| 1,311,227 | 7/19 | Hartman | 222—413 X |
| 1,427,013 | 8/22 | Partridge | 222—413 X |
| 2,279,640 | 4/42 | Ringmarck | 222—252 |
| 2,509,543 | 5/50 | Truax | 222—241 X |
| 2,593,803 | 4/52 | Schofield | 222—413 X |
| 2,957,681 | 10/60 | Moultrie | 259—105 |
| 3,047,034 | 7/62 | Sassmannshausen et al. | 222—241 X |

FOREIGN PATENTS 720,933    5/42    Germany.

LOUIS J. DEMBO, *Primary Examiner.*